Patented Feb. 24, 1931

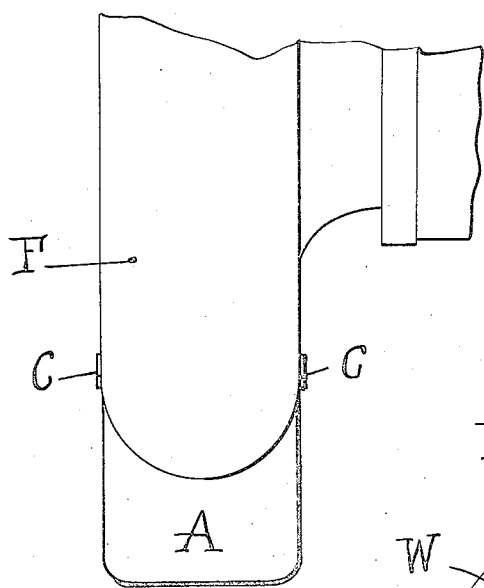
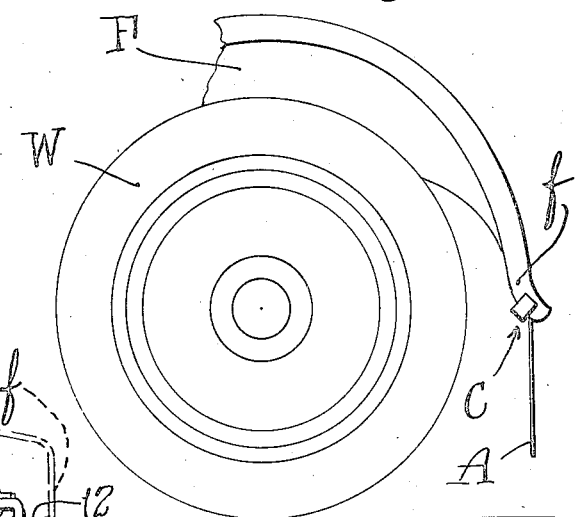
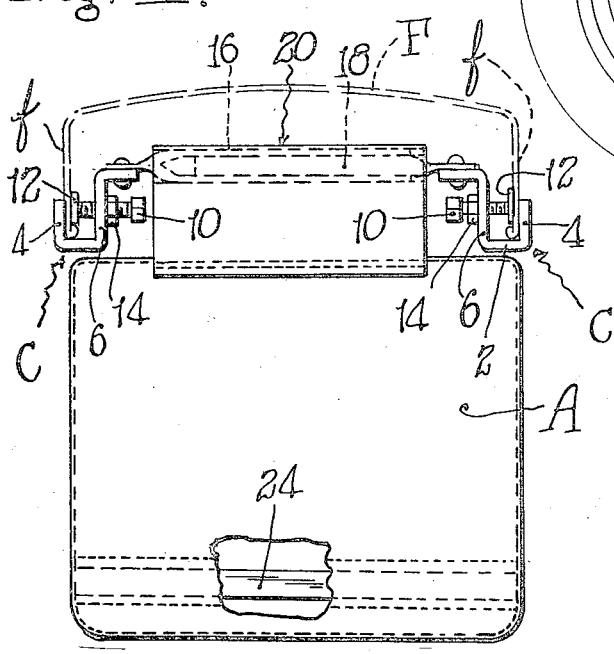

1,794,122

UNITED STATES PATENT OFFICE

MAX SCHAFFER, OF SPRINGFIELD, MASSACHUSETTS, ASSIGNOR TO HAMPDEN AUTOMOTIVE PRODUCTS, INC.

GUARD FOR AUTOMOBILE FENDERS

Application filed October 22, 1928. Serial No. 314,177.

This invention relates to improvements in wheel guards for vehicles and is directed particularly to guards adapted for attachment to the fenders or mud guards of automobiles and the like.

It is common practice to attach guards in the form of pliable aprons to the lower ends of the rear fenders of automobiles to prevent road material being thrown by the rear wheels up onto the fenders and rear of the car and according to ordinary practice these aprons are cut to certain size and secured to the fenders by bolts or the like. This necessitates the making of certain sized aprons for certain cars and the drilling of fenders all of which is objectionable.

According to the principal objects of this invention I provide a guard of the class described which is not only adapted for attachment to the fender of a car without the necessity of drilling but one which is adjustable so as to be thereby adapted for use in connection with fenders of various sizes or widths.

The invention is adapted for broad application but for purposes of disclosure it will be described in the form at present preferred by means of the acompanying drawings, in which Fig. 1 is an elevational view of a guard which embodies the novel features of the invention.

Fig. 2 is a partial side elevational view showing a rear fender of an automobile with a guard affixed thereto, and Fig. 3 is a rear elevational view of one fender of an automobile showing the guard of my invention affixed thereto.

Referring to the drawings in detail the invention will now be described:

F represents a fender of an automobile which as usual consists of a channel like member of metal which is curved so as to overlie a wheel W and extend rearwardly and downwardly at the rear thereof as shown in Fig. 2. Ordinarily the fender is provided with legs or flanges $f$ on opposite sides thereof which extend inwardly or towards the wheel and these I make use of for supporting the guard of my invention which will now be described.

Clamps C for attaching the structure to the fender are provided which consist of U shaped members 2 each of which has an outer leg or fixed jaw 4 and an inner leg 6. As is shown in Fig. 1 the outer legs 4 are adapted to bear against the outer sides of the flanges $f$ of the fender while clamping screws 10 in the threaded engagement with the inner legs 4 carry on their ends movable jaws or clamp plates 12 for bearing on the inner sides of the flanges $f$. Lock nuts 14 on the screws serve to lock the screws against turning in the members 6 so that when the flanges of a fender are clamped by the jaws the screws will not be displaced by a vibrating tendency of the fender.

To one of the clamps is secured a tubular member 16 while to the other is secured a rod like member 18. These function as a support and are in sliding engagement to permit the clamps to be adjusted or moved towards and away from one another whereby they may be secured to the flanges of fenders of various widths.

An apron A is provided which is preferably made of one or more plies of some flexible material such as fabric or imitation leather and has on its upper side a strap or loop 20 which is adapted to fit loosely on the support formed by the relatively slidable rod and tube so that the apron may swing back and forth.

The apron A is preferably weighted adjacent its lower end by a weight 24 whereby the swinging movement of the apron is limited to some extent. This weight may take the form of a metal bar or rod secured to the apron by being confined in a pocket formed by stitching outer and inner plies of the apron together or if desired when the apron comprises a single ply of material it may be riveted or otherwise secured thereto in some convenient manner.

As will be observed the clamps may be moved towards and away from one another for attachment to fenders of various widths and they may be clamped thereto at any point desired such as adjacent the lower end thereof of. When in position the apron which is supported thereby may swing back and forth and as will be observed forms a continuation for the fender at the rear of the wheel to prevent road material being thrown upwardly over the fender and rear of the vehicle.

Various changes may be made in the form of the invention without departing from the scope thereof and I therefore prefer to be limited, if at all, by the appended claims rather than by the foregoing description.

What I claim is:

1. A wheel guard for attaching to vehicle mud guards of different widths that are provided with parallel depending flanges at opposite sides thereof comprising, separate U-shaped clamps each including outer and inner legs, members adjustable in said inner legs for bearing against the inner faces of the flanges of a mud guard whereby the outer legs are brought to bear on the outer faces of the flanges for affixing said clamps to said flanges, a pair of bars having their opposite outer ends connected to the inner legs of said clamps and their inner ends in sliding engagement to form a support between said clamps and flanges clamped thereby which is adjustable in length accordingly as the guard is applied to guards of different width and an apron provided with an upper loop portion for loosely embracing the support and a depending portion, the said loop portion being of less length than the distance between said clamps and the said depending portion being wider than the loop portion so that opposite side edges thereof will extend outwardly to align with the flanges of the mud guard, all adapted and arranged whereby the inner legs of the clamps, support and loop of the apron may be connected behind a mud guard when in place.

2. In combination, an automobile fender having depending flanges, an apron, adjustable supporting means therefor, and clamps carried by the apron supporting means for engaging said depending flanges, said clamps including channeled members for receiving therebetween the aforesaid depending flanges and adjustable elements carried by the inner sides of said channel shaped member for engagement with the inner faces of the flanges.

3. A wheel guard structure for attachment to an automobile fender having depending flanges, comprising in combination, a pair of longitudinally adjustable apron supporting members operatively connected to each other, and for disposition beneath the fender, a pair of substantially U-shaped clamps carried by the outer ends of the apron supporting members for disposition over the lower edge of the respective depending flange, the outermost arm of each clamp being adapted to engage with the outer face of the respective depending flange, an element adjustably disposed through the innermost arm of each clamp for engagement with the inner face of the respective depending flange, and an apron suspended from said supporting members.

4. A wheel guard structure for attachment to an automobile fender having depending flanges, comprising in combination, a pair of longitudinally adjustable apron supporting members operatively connected to each other, and for disposition beneath the fender, a pair of substantially U-shaped clamps carried by the outer ends of the apron supporting members for disposition over the lower edge of the respective depending flange, the outermost arm of each clamp being adapted to engage with the outer face of the respective depending flange, an element adjustably disposed through the innermost arm of each clamp for engagement with the inner face of the respective depending flange, and an apron suspended from said supporting members, said apron being mounted for swinging movement with respect to the apron supporting members.

5. In combination, an automobile fender having depending flanges, an apron, adjustable supporting means therefor, and clamps carried by the apron supporting means for engaging said depending flanges, said clamp including channeled members for receiving therebetween the aforesaid depending flanges and adjustable elements carried by a side of said channel shaped members for engagement with a face of said flanges.

MAX SCHAFFER.